(12) United States Patent
Huin

(10) Patent No.: US 8,520,856 B2
(45) Date of Patent: Aug. 27, 2013

(54) CONTROLLING THE VALIDITY PERIOD OF A DECRYPTION KEY

(75) Inventor: Steeve Huin, Hoofddorp (NL)

(73) Assignee: Irdeto B.V. (NL)

( * ) Notice: Subject to any disclaimer, the term of this patent is extended or adjusted under 35 U.S.C. 154(b) by 357 days.

(21) Appl. No.: 12/791,342

(22) Filed: Jun. 1, 2010

(65) Prior Publication Data

US 2010/0306527 A1    Dec. 2, 2010

(30) Foreign Application Priority Data

Jun. 2, 2009  (EP) .................................... 09161670

(51) Int. Cl.
*H04L 9/00* (2006.01)
(52) U.S. Cl.
USPC ............ 380/277; 380/278; 380/279; 713/153
(58) Field of Classification Search
USPC .......................... 713/153; 380/279, 277, 278
See application file for complete search history.

(56) References Cited

U.S. PATENT DOCUMENTS

| | | | |
|---|---|---|---|
| 6,647,504 B1 * | 11/2003 | Van Paepegem | 713/400 |
| 2003/0074565 A1 * | 4/2003 | Wasilewski et al. | 713/182 |
| 2010/0027787 A1 * | 2/2010 | Benkert et al. | 380/45 |
| 2010/0104100 A1 * | 4/2010 | William Gibbens | 380/277 |
| 2010/0306795 A1 * | 12/2010 | Praden | 725/31 |

FOREIGN PATENT DOCUMENTS

| | | |
|---|---|---|
| FR | 2912270 | 8/2008 |
| FR | 2912270 A1 | 8/2008 |

OTHER PUBLICATIONS

"European Application Serial No. 09161670.6, European Search Report issued Jan. 21, 2010", 6 pgs.
"Service and Content Protection for Mobile Broadcast Services", vol. 1, Retrieved from Internet http://member.openmobilealliance.org/ftp/public_documents/bcast/, (Dec. 2008), 124 pgs.
Islam, Asad, et al., "Efficient Algorithms for Editing H.263 and MPEG-4 Videos on Mobile Terminals", *Image Processing, 2006 IEEE International Conference ON*, (Oct. 1, 2006), 3181-3184.
"European Application Serial No. 09161670.6, Office Action mailed Jul. 11, 2011", 6 pgs.
"European Application Serial No. 09161670.6, Response filed Nov. 21, 2011 to Office Action mailed Jul. 11, 2011", 14 pgs.

* cited by examiner

*Primary Examiner* — Harunur Rashid
(74) *Attorney, Agent, or Firm* — Hayes Soloway P.C.

(57) ABSTRACT

The invention provides a method and a system for allowing access to a digital broadcast stream on a client device in a conditional access system, wherein the start time and end time of events in the broadcast stream are predefined. If entitled, a server system transmits for an even the start time and end time to the client device. As long as the current time, which is also transmitted from the server system to the client device, is within the range from the start time to the end time, the client device is allowed to decrypt the broadcast stream. To allow events to extend in time without requiring the generation of a new end time, the start time and end time on the one hand and the current time on the other hand are defined on different timescales.

11 Claims, 4 Drawing Sheets

CONTROLLING THE VALIDITY PERIOD OF A DECRYPTION KEY

CLAIM OF PRIORITY

The present patent application claims priority under 35 U.S.C. 119 to European Patent Application (EPO) No. 09161670.6, filed Jun. 2, 2009, the entire contents of which is incorporated herein by reference.

FIELD OF THE INVENTION

The present invention relates to conditional access systems for conditionally allowing access to a digital broadcast stream on a client device, wherein the start time and end time of events in the broadcast stream are predefined. More specifically the invention relates to an OMA BCAST system wherein the digital broadcast stream is transmitted to mobile terminals.

BACKGROUND

Open Mobile Alliance Broadcast (also known as OMA BCAST) is an international standard wherein, amongst others, conditional access (CA) systems are specified for use with mobile devices that are capable of receiving digital broadcast streams, such as digital TV streams. The OMA BCAST specification describes a CA system that enables access to a broadcast transmission for a period between two defined times, i.e. between a start time with timestamp Ts and an end time with timestamp Te. The part of the broadcast transmission between the start and end time is called an event. The current time is transmitted in cryptograms to mobile devices as timestamp Tc. Typically this involves sending short term key messages (STKM) containing the cryptograms. These cryptograms also contain a descrambling key (also known as a control word or CW) for descrambling the broadcast stream. Successive timestamps Tc are transmitted in successive cryptograms to update the current time in the mobile device. If the mobile device is entitled to watch an event, e.g. in case of a subscription to the event, the timestamps Ts and Te identifying the start en and time of the event in the broadcast stream are transmitted to the mobile device. Typically this involves sending a long term key message (LTKM) containing the Ts and Te values. The mobile terminal is entitled to descramble the broadcast stream if Tc falls within the range Ts-Te.

In the OMA BCAST specification, events are predefined by defining timestamps Ts and Te for the events in a broadcast stream. In practice an event can have a variable start and end time. An example of this is a sport event that is undecided at the scheduled end time of the regular game play and an extension of the game is needed to determine the winner. A fixed time period for events as implemented by OMA BCAST does not allow entitlements to be associated with events that have a flexible schedule or a variable duration. In the OMA BCAST system, simply extending the allowed period of access to the broadcast stream to accommodate any variations in start and/or end time of an event is undesirable, as illustrated in the following example.

Assume that the broadcast stream contains a first event being a sports event that is scheduled from Ts1=0 to Te1=1500 and a second event being a movie that is scheduled from Ts2=1501 to Te2=3000. A first user is entitled to watch the sports event, but not the movie. Hereto, the mobile device of the first user receives a LTKM containing Ts1 and Te1 defining the start time and end time of the sports event in the broadcast stream and allowing decryption of the broadcast stream during this time period. A second user is entitled to watch the movie, but not the sports event. Hereto, the mobile device of the second user receives a LTKM containing Ts2 and Te2 defining the start time and end time of the movie in the broadcast stream and allowing decryption of the movie during this time period. A timestamp Tc indicating the current time and a CW for decrypting the broadcast stream are transmitted in a STKM to the mobile devices at a predefined time interval, e.g. 10 times per second. Each mobile device determines if the current time Tc is within an entitled time frame Ts-Te and if this is the case the CW is used to descramble the broadcast stream. In case of extending the sports event, updating Te1 to a later time—e.g. to Te1=1800—and broadcasting the sports event accordingly, enables the second user to watch the sports event starting from Tc=1501 until Tc=1800 as this time period falls within Ts2 and Te2. The problem is cascaded to further events as the second event needs to be extended to Te2=3300 to allow the second user to watch the whole movie.

The OMA BCAST specification allows updating all Te and Ts values for all events and all users in the broadcast system. This is undesirable though, because the required LTKM messages for updating these timestamps result in processing overhead and increased network traffic.

SUMMARY OF THE INVENTION

It is an object of the invention to enable an OMA BCAST system to extend the time for watching an event in a broadcast stream on an entitled client device without enabling watching the extended event on non-entitled client devices, while, to enable the time extension, processing overhead and network traffic are not significantly increased.

According to an aspect of the invention a method is proposed for controlling a validity of a decryption key in a broadcast system. The broadcast system comprises a server system and a data source that are communicatively linked to a client device. The data source is arranged to broadcast encrypted data to the client device. The server system is arranged to provide the decryption key to the client device. The client device is arranged to decrypt the encrypted data using the decryption key. The method comprises the step of generating in the server system a first timestamp indicating a start time from which the decryption key is valid and a second timestamp indicating an end time until which the decryption key is valid. The method comprises the step of transmitting a first message comprising the first timestamp and the second timestamp from the server system to the client device. The method comprises the step of generating in the server system a third timestamp indicating a current time. The method comprises the step of transmitting a second message comprising the third timestamp from the server system to the client device. The first timestamp and the second timestamp are defined on a first timescale. The third timestamp is defined on a second timescale. The first timescale is defined as the second timescale multiplied by a first factor larger than one. The first, second and third timestamp enable the client device to decrypt the encrypted data only if the third timestamp is greater than or equal to the first timestamp and less than or equal to the second timestamp.

According to an aspect of the invention a server system is proposed for controlling a validity of a decryption key in a broadcast system. The broadcast system comprises the server system and a data source that are communicatively linked to a client device. The data source is arranged to broadcast encrypted data to the client device. The server system is arranged to provide the decryption key to the client device.

The client device is arranged to decrypt the encrypted data using the decryption key. The server system comprises a timestamp generator configured to generate a first timestamp indicating a start time from which the decryption key is valid, a second timestamp indicating an end time until which the decryption key is valid, and a third timestamp indicating a current time. The server system comprises a transmitter module configured to transmit a first message comprising the first timestamp and the second timestamp to the client device. The transmitter module is configured to transmit a second message comprising the third timestamp to the client device. The first timestamp and the second timestamp are defined on a first timescale. The third timestamp is defined on a second timescale. The first timescale is defined as the second timescale multiplied by a first factor larger than one. The first, second and third timestamp enable the client device to decrypt the encrypted data only if the third timestamp is greater than or equal to the first timestamp and less than or equal to the second timestamp.

According to an aspect of the invention a computer program element is proposed, which, when being executed by a processor, is adapted to carry out a method for use in the server system having one or more of the above mentioned features. The method comprises the step of generating a first timestamp indicating a start time from which a decryption key is valid, a second timestamp indicating an end time until which the decryption key is valid, and a third timestamp indicating a current time. The first timestamp and the second timestamp are on a first timescale. The third timestamp is on a second timescale. The first timescale is defined as the second timescale multiplied by a first factor larger than one.

Thus the invention advantageously enables extending an event in a broadcast stream without enabling a non-entitled client device to decrypt and watch the extended event. Instead of using one timescale for generating the first, second and third timestamp, two different timescales are used. This effectively enables the current time received in the client device as the third timestamp to advance slower through the entitlement period—i.e. the period between the first and second timestamp—by a factor equal to the first factor. If the event is extended, the end time allows the event to continue as the current time has not reached the end time yet. If the event ends at the expected time, the CA system can increase the value of the third timestamp such that at the end of the event the value of the third timestamp equals the value of the second timestamp. As no messages need to be transmitted to the client device to update the first timestamp and/or second timestamp, processing overhead and network traffic are not significantly increased.

Typically the server system and the data source are separate systems, but it is possible to integrate the two into a single system. The server system can consist of a plurality of subsystems to allow e.g. separation of decryption key provisioning and timestamp generation. It is possible that the first timestamp and second timestamp are generated by a subsystem different from the subsystem generating the third timestamp. In the latter case separate timestamp generators are used for generating the timestamps in the subsystems.

The embodiments of claims 2, 8 and 14 advantageously enable fine-tuning of the third timestamp to effectively have the current time advance through the entitlement period at a time rate equal to the first factor divided by the second factor.

The embodiments of claims 3 and 9 advantageously enable the decryption key to be updated with each third timestamp.

The embodiments of claims 4 and 10 advantageously enable the client device to regularly verify whether or not the event is still being broadcast and decryption of the encrypted data is still allowed.

The embodiments of claims 5 and 11 advantageously enable the invention to be used in existing systems.

The embodiments of claims 6 and 12 advantageously enable the invention to be used in existing OMA BCAST systems.

Hereinafter, embodiments of the invention will be described in further detail. It should be appreciated, however, that these embodiments may not be construed as limiting the scope of protection for the present invention.

BRIEF DESCRIPTION OF THE DRAWINGS

Aspects of the invention will be explained in greater detail by reference to exemplary embodiments shown in the drawings, in which.

DETAILED DESCRIPTION OF THE DRAWINGS

Figure 1:
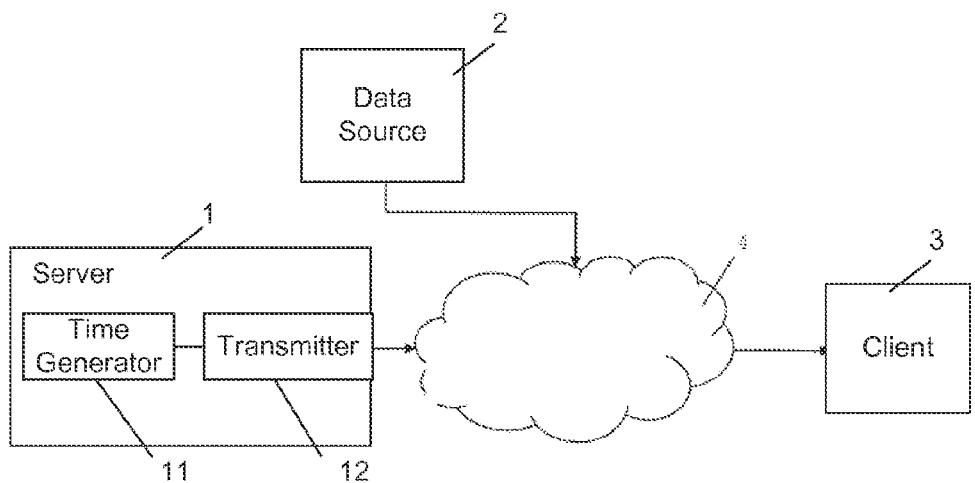
FIG. 1 shows a broadcast system of an exemplary embodiment of the invention.

FIG. 1 shows a simplified architecture of a broadcast system, which is e.g. an OMA BCAST system. In the broadcast system encrypted data is transmitted through network 4 from a data source 2 to a client device 3. Control words (or CWs in short) for decrypting the encrypted data is transmitted through the network 4 from a server system 1 to the client device 3.

The data source 2 typically does not support an interactive communication channel and cannot communicate with other entities except using a broadcast channel through the network 4. The data source 4 can have an implicit return channel separate from the broadcast channel, e.g. through a telephone line, web portal or service desk.

The client device 3, which is e.g. a mobile terminal with a smartcard, decrypts the data to enable the data to be displayed on the client device 3. The smartcard is used to securely obtain the CWs needed for decrypting the data in the client device. The smartcard is e.g. a BCAST smartcard that supports one or more of the following sets of applications: 3GPP USIM with support for BCAST processing; 3GPP USIM with support for BCAST processing and BCAST BSIM; 3GPP2 UIM with support for BCAST processing; 3GPP2 CSIM with support for BCAST processing; 3GPP2 CSIM with support for BCAST processing and BCAST BSIM. Herein USIM is an acronym for Universal Subscriber Identity Module as defined in the 3GPP standard. The USIM resides in the memory of a UICC to register services provided by 3GPP mobile networks with the appropriate security. UIM is an acronym for User Identity Module as defined in the 3GPP2 standard. The UIM resides in the client device to register services provided by 3GPP2 mobile networks with the appropriate security. CSIM is an acronym for CDMA2000 Subscriber Identify Module as defined in the 3GPP2 standard. The CSIM resides in the memory of a UICC to register services provided by 3GPP2 mobile networks with the appropriate security. The BSIM is a BCAST application residing on the UICC. The UICC, which is an acronym for Universal Integrated Circuit Card, is a physically removable secured device in the client device 3.

The server system 1 provides the client device 3 with long term key messages (LTKM) and short term key messages (STKM). The LTKM contains one or more keys, e.g. a service encryption key or program encryption key (SEK/PEK), and possibly other information like permissions or other attributes that are linked to items of events or services in the broadcasted data. The STKM is a message delivered alongside the encrypted data, carrying CWs such as traffic encryption keys (TEK). The TEKs are sent encrypted by the SEK or PEK. The TEKs may optionally be encrypted with a terminal binding key (TBK) before being encrypted by the SEK/PEK, to provide for terminal binding. Separate SEK and PEK keys can have different lifetimes and can be used to provide, for a single event or service within the broadcasted data, different granularities of purchase periods to different customers. This allows for the efficient implementation of both subscription and pay-per-view business models for the same event or service. Pay-per-view customers are provided with a PEK that is only valid for a single event while subscribers would be provided with a SEK, valid for reception of the service for some longer period.

Figure 2:
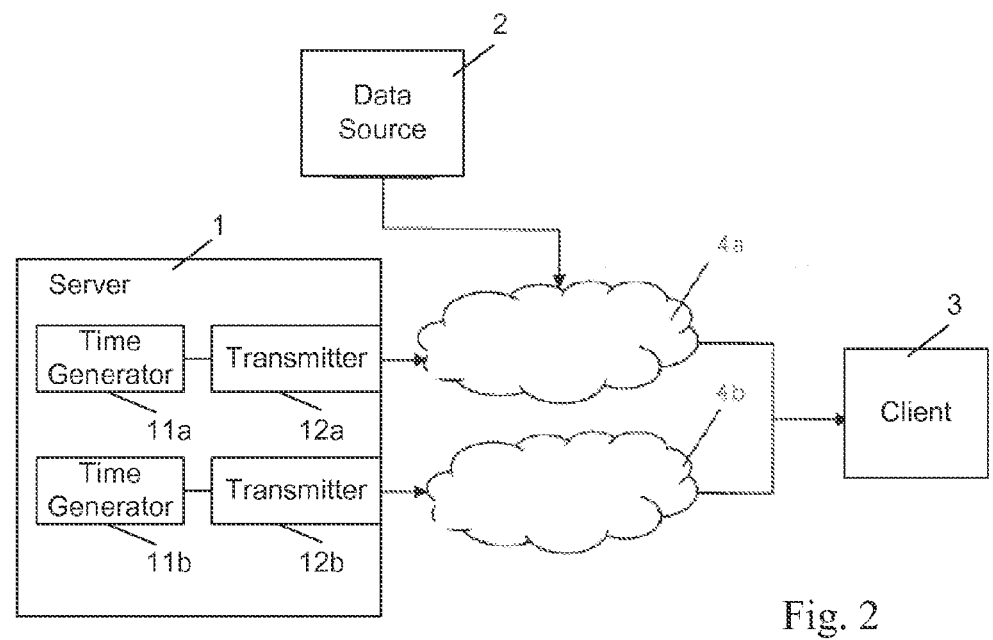
FIG. 2 shows a broadcast system of an exemplary embodiment of the invention.

FIG. 2 shows a simplified architecture of a broadcast system similar to the broadcast system presented in FIG. 1, with the difference that the encrypted data and the STKMs are transmitted through network 4a and the LTKMs are transmitted through another network 4b. Network 4a is e.g. a broadcast network based on DBT-T technology while network 4b is a 3GPP or 3GPP2 mobile network. This enables the LTKMs to be transmitted as e.g. SMS messages from the server system 1 to the client device 3 while DVB technology is used to deliver the encrypted data and STKMs.

Referring to FIG. 1, the server system 1 contains a timestamp generator 11 and a transmitter module 12. The timestamp generator, which can be implemented as a software module or implemented in hardware, generates a timestamp Tc indicating the current time. The Tc is transmitted via the transmitter module 12 to the client device 3 in a STKM, typically together with one or more CWs. With each transmission of a STKM the Tc is updated to increases the time. The Tc is used by the client device as indication of the current time. To enable the server system 1 to control the current time, no internal clock in the client device is used.

The timestamp generator 11 further generates timestamps Ts and Te indicating a start time and an end time of an entitlement period for an event in the broadcasted data. Ts and Te are transmitted via transmitter module 12 to the client device 3 in a LTKM. A KV (Key Validity) field included in the LTKM is used for this purpose.

In the example of FIG. 2, Ts and Te are generated by timestamp generator 11a and transmitted in a LTKM via transmitter module 12a and broadcast network 4a to the client device 3. Tc is generated by timestamp generator 11b and transmitted in a STKM via transmitter module 12b and network 4b to the client device 3.

Once generated and transmitted to the client device 3, the timestamps Ts and Te of an event are preferably fixed. This ensures that, once transmitted, no other LTKMs need to be transmitted for the event. Hereby it is avoided that, e.g. in case of using SMS messages, the network load on the mobile network 4b and SMS processing load on the mobile terminal 3 can become excessively high.

The invention enables the broadcast system to cope with access to events that do overtime (for example a football match that runs with additional time), even though Ts and Te are fixed. In these overrun scenarios, if a client device has been granted with access to the event between Ts and Te, it should be able to view the event until the prolonged end without resending LTKMs with some extended timestamps. Also other client devices not entitled to watch the event should be prevented from watching the event during overtime.

Ts and Te are defined on a first timescale. On this timescale an increase of the timestamp by 1 corresponds e.g. to 1 second. An event with a Ts value of 0 and a Te value of 1500 then has a duration of Te-Ts=1500 which corresponds to 1500 seconds. If e.g. the first timescale is defined as having 2 elements on the timescale corresponding to 1 second, then the event would have a duration of Te-Ts=1500 corresponding to 750 seconds. If e.g. the first timescale is defined as having 1 element on the timescale corresponding to 2 seconds, then the event would have a duration of Te-Ts=1500 corresponding to 3000 seconds. Any other definition of the first timescale is possible.

Tc is defined on a second timescale. The first timescale is different from the second timescale and is defined as the second timescale multiplied by a factor larger than 1. If e.g. the second timescale is defined as having 1 element on the timescale corresponding to 1 second and the factor equals 2, then on the first timescale 2 elements on the timescale correspond to 1 second. If e.g. the second timescale is defined as having 6 elements on the timescale corresponding to 1 second and the factor equals 1.5, then on the first timescale 9 elements on the timescale correspond to 1 second.

Using two different timescales for generating a start time and an end time for an event on the one hand and generating a current time on the other hand enables the system to have the current time as indicated by Tc proceeding slower through the event defined between Ts and Te, whereby the slowdown is controlled by the factor.

When generating an STKM, the timestamp Tc can be calculated as follows. If no event is currently running, the timestamps are increasing as if on the first timescale as there is no need to anticipate an event time overrun. If e.g. the factor equals 2, then Tc=(previous Tc)+(time elapsed in seconds since previous Tc converted to second timescale)*2. If an event is currently running, then a slow-motion is applied to the timestamps Tc in order to be able to cope with a potential overtime of the event: Tc=(previous Tc)+(time elapsed in seconds since previous Tc converted to second timescale). I.e. the factor 2 is not applied.

With this method, if a client device is entitled to watch an event, the timestamps Ts and Te for the event will remain within the timestamp range granted for the key distributed even in the event where the event runs for more time than originally expected.

The timestamp values are e.g. generated as a 32-bit value. If the factor equals 2, then, if e.g. timestamps Tc are representing seconds, a maximum of $2^{32}/2=4,294,967,296/2$ seconds≈136/2 years≈68 years can be assigned to the value of Tc, while Te can have a maximum value of $2^{32}≈136$ years.

Figure 3:
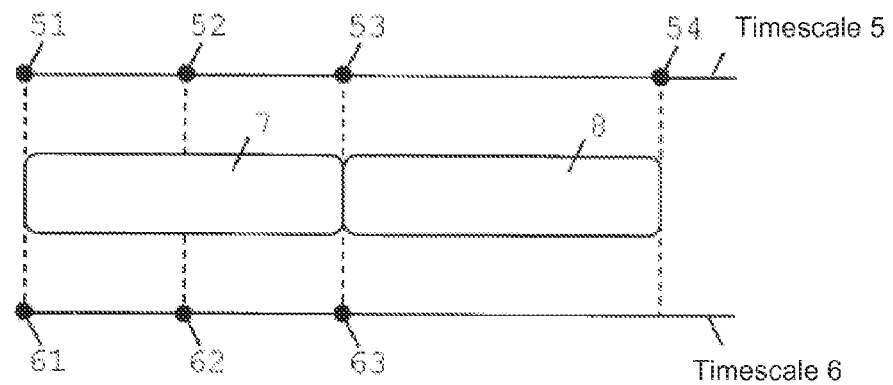
FIG. 3 shows a time diagram for two events and with timestamps on two different time scales of an exemplary embodiment of the invention.
Figure 4:
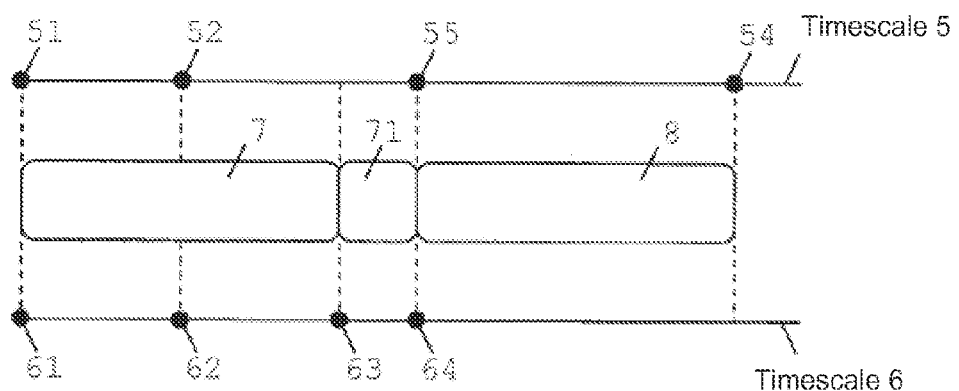
FIG. 4 shows a time diagram for two events and with timestamps on two different time scales of an exemplary embodiment of the invention.

FIG. 3 shows how timestamps Tc 61,62,63 are generated for a sports event indicated by 7 in case the sports event 7 does not overrun. FIG. 4 shows the sports event 7 whereby the event is prolonged by overtime. The part of the sports event in overtime is indicated by 71. A movie event following the sports event is indicated by 8. In the examples of FIG. 3 and FIG. 4 the first timescale 5 is defined as the second timescale 6 multiplied by a factor 2. Any other factor larger than 1 could have been applied.

Referring to FIG. 3, the start time and the end time of the sports event 7 are generated on the first timescale 5 as Ts 51 and Te 53, e.g. Ts(51)=0 and Te(53)=1000. Herein "(51)" indicates the location on the first timescale 5 indicated by 51 and "(53)" indicates the location indicated by 53. Other locations on the timescales are indicated similarly. For the movie event 8 Ts(53) equals Te(53) and Te(54)=2000. It is possible that a subsequent event has a start time larger than the end time of the previous event.

The timestamp Tc indicating the current time is generated on the second timescale 6. At the start of the sports event 7 Tc(61)=0. Halfway the sports event 7, when on the first timescale 5 the time would be at location 52 having the value of 500, the current time on the second timescale 6 has a value of Tc(62)=250. At the end of the event, i.e. at Te(53)=1000, Tc(63) will only have reached a value of 500. To allow the movie event 8 to start at Ts(53)=1000, the next Tc is generated such as to jump to the value Tc=1000.

As illustrated with FIG. 3, due to the factor of 2 the timestamps Tc are increased two times slower than what would be expected in view of Ts and Te. However, this is completely transparent to the client device 3 as the timestamp Tc automatically 'jumps' at the beginning of each event to maintain predictability of timestamps for each event (and therefore to ensure strict access to only those who have purchased each event).

Referring to FIG. 4 where the sports event 7 is going into overtime as indicated by the overtime event 71, at the end of the originally planned sports event 7 the current time as observed by the client device 3 only reached the value of Tc(63)=500. The original end time Te(53) as indicated in FIG. 3 is now shifted to the end of the overtime event 71, but its value is unchanged. Thus Te(55)=1000, which is equal to original Te(53)=1000. As a result no new Te needs to be generated and no LTKM needs to be transmitted to the client device to inform the client device about an updated Te.

In the example of FIG. 4 when the current time on the second timescale 6 reaches a value of Tc(64)=750, the sports event 7 including the overtime event 71 ends. The value of Tc is then still within the range of Ts(51)=0 to Te(55)=1000, but not within the range of Ts(53)=1000 to Te(54)=2000. As a result the client device 3 that was entitled to decrypt the sports event by receiving the LTKM with Ts=0 and Te=1000 is able to decrypt the sports event 7 and overtime event 71, while another client device that is entitled to decrypt the movie event 8 but not the sports event by receiving the LTKM with Ts=1000 and Te=2000 is not able to decrypt the sports event 7 nor the overtime event 71.

Figure 5:
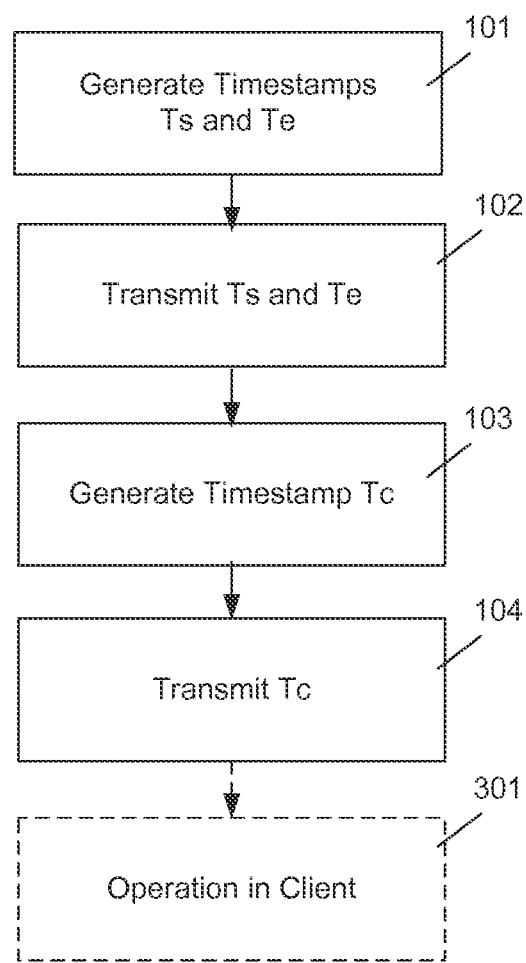
FIG. 5 shows a schematic view of a method of an exemplary embodiment of the invention.

In FIG. 5 an exemplary embodiment of steps performed by the server system 1 are shown with solid lines. A step subsequently performed by the client device 3 is shown with dashed lines. The start time and end time of an event 7 are generated in step 101 as timestamp Ts 51 and timestamp Te 53. The timestamps Ts and Te are stored in the KV field of an LTKM and transmitted to the client device in step 102. The current time is generated as timestamp Tc 61,62,63 in step 103 and stored in a STKM. In step 104 the STKM is transmitted to the client device 3. Ts 51 and Te 53 are defined on a first timescale 5 and Tc is defined on a second timescale 6, whereby the first timescale 5 is defined as the second timescale 6 multiplied by a factor larger than one, e.g. by a factor 2. The timestamps Ts, Te and Tc enable the client device 3 to decrypt events only if entitled. Hereto the client device 3 verifies on each receipt of a Tc whether or not Tc is within the range Ts-Te. This is indicated in FIG. 5 as step 301.

Figure 6:
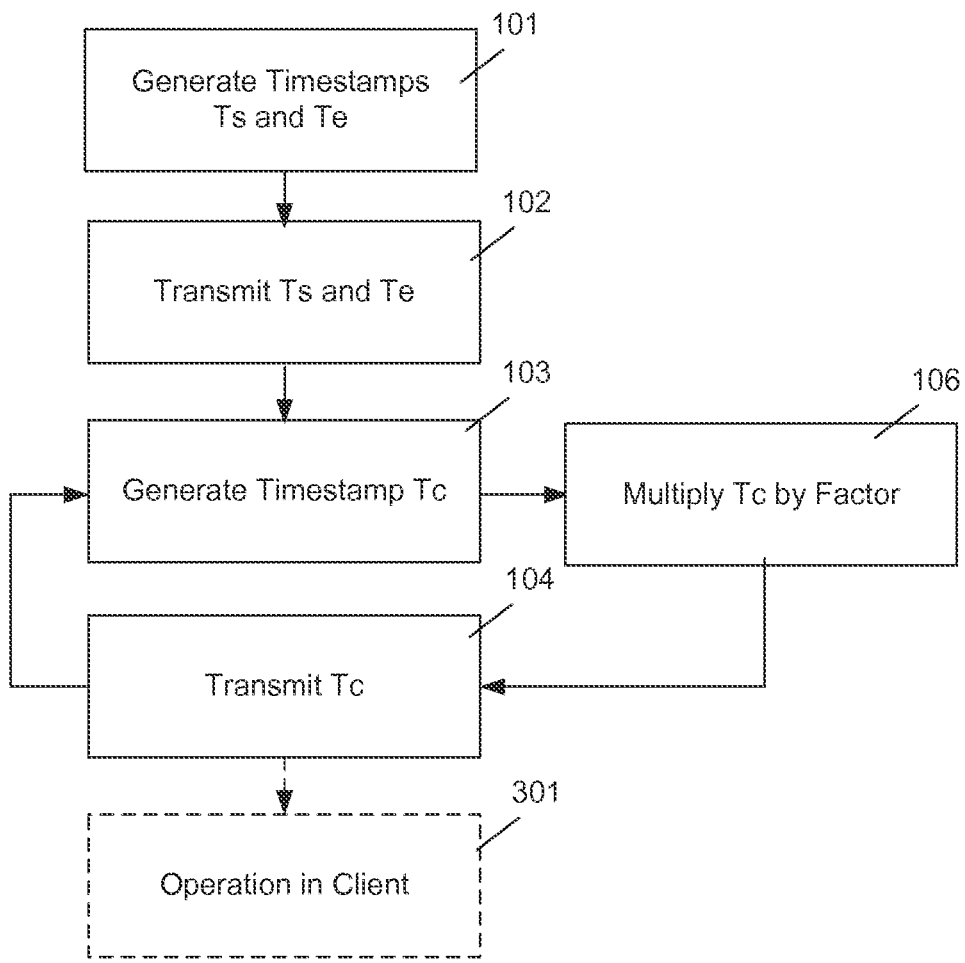
FIG. 6 shows a schematic view of a method of an exemplary embodiment of the invention.

In FIG. 6 another example is shown wherein steps performed by the server system 1 are shown with solid lines and a step performed by the client device 3 is shown with dashed lines. In addition to the steps as shown in FIG. 5, in step 106 timestamp Tc is multiplied by a factor larger than zero before transmitting Tc to the client device 3 in step 104. Multiplying Tc with a factor between 0 and 1 results in a smaller Tc enabling Tc to advance slower in time relative to the timescale 6. Multiplying Tc with a factor larger than 1 results in a larger Tc enabling Tc to advance faster in time relative to the timescale 6.

The arrow between step 104 and step 103 indicates that timestamp Tc can be generated and transmitted at a predefined time interval to enable to client device 3 to keep track of the current time as indicated by the server system 1. For each generated Tc the same factor, other factors or a factor of 1 may be applied to influence the advancing of time as observed by the client device 3.

The generation of the timestamps Ts, Te and Tc can be implemented in software in the server system 1. The transmission of the LTKM and STKM can be controlled by software in the server system 1. If, e.g., the LTKM and STKM are transmitted through a single network 4 as indicated in FIG. 1, then timestamp generator 11 and transmission module 12 are a computer program elements for, respectively, generating and transmitting Ts, Te and Tc. If, e.g., the LTKM and STKM are transmitted through separate networks 4a and 4b as indicated in FIG. 2, then timestamp generators 11a and 11b and transmission modules 12a and 12b may be implemented as separate computer program elements for, respectively, generating and transmitting Ts, Te and Tc.

The start time and end time of an event may be read from a database or received from an external data source, from which 32-bit timestamps Ts and Te are generated. For generating the 32-bit timestamp Tc, a hardware clock or software clock may be used as well as a temporary memory for storing the current and reading the previous timestamp Tc.

What is claimed is:

1. A method for controlling a validity of a decryption key in a broadcast system comprising a server system and a data source arranged to broadcast encrypted data to a client device, the server system being arranged to provide the decryption key to a client device, the method comprising:
   generating in the server system a first timestamp indicating a start time from which the decryption key is valid and a second timestamp indicating an end time until which the decryption key is valid;
   transmitting a first message comprising the first timestamp and the second timestamp from the server system to the client device;
   generating in the server system a third timestamp indicating a time to be compared with the first timestamp and the second timestamp; and
   transmitting a second message comprising the third timestamp from the server system to the client device,
   wherein the first timestamp and the second timestamp are defined on a first timescale and the third timestamp is defined on a second timescale, and
   wherein the first timescale is defined as the second timescale multiplied by a first factor larger than one so that the third timestamp advances slower in time relative to the first timescale during an event associated with the first timestamp and the second timestamp,
   wherein the first, second and third timestamp enable the client device to decrypt the encrypted data with the decryption key, in response to determining that the third timestamp is greater than or equal to the first timestamp and less than or equal to the second timestamp, and further comprising:

in the server system, multiplying the third timestamp by a second factor larger than zero to obtain the third timestamp to be transmitted to the client device.

2. The method according to claim 1, wherein the second message further comprises the decryption key.

3. The method according to claim 1, wherein the third timestamp is generated and the second message is transmitted at a predefined time interval.

4. The method according to claim 1, wherein the first message is a long term key message and the second message is a short term key message.

5. The method according to claim 4, wherein the broadcast system is an OMA BCAST system.

6. A server system for controlling a validity of a decryption key in a broadcast system, the broadcast system comprising a data source arranged to broadcast encrypted data to a client device, the server system being arranged to provide the decryption key to the client device, the server system comprising:

a timestamp generator configured to generate a first timestamp indicating a start time from which the decryption key is valid, a second timestamp indicating an end time until which the decryption key is valid, and a third timestamp indicating a time to be compared with the first timestamp and the second timestamp; and a transmitter module configured to transmit a first message comprising the first timestamp and the second timestamp to the client device, the transmitter module further being configured to transmit a second message comprising the third timestamp to the client device, wherein the first timestamp and the second timestamp are defined on a first timescale and the third timestamp is defined on a second timescale, and wherein the first timescale is defined as the second timescale multiplied by a first factor larger than one so that the third timestamp advances slower in time relative to the first timescale during an event associated with the first timestamp and the second timestamp, wherein the first, second and third timestamp enable the client device to decrypt the encrypted data with the decryption key, in response to determining that the third timestamp is greater than or equal to the first timestamp and less than or equal to the second timestamp, and wherein the timestamp generator is further configured to multiply the third timestamp by a second factor larger than zero to obtain the third timestamp to be transmitted to the client device.

7. The server system according to claim 6, wherein the second message further comprises the decryption key.

8. The server system according to claim 6, wherein timestamp generator is configured to generate the third timestamp and the transmitter module is configured to transmit the second message at a predefined time interval.

9. The server system according to claim 6, wherein the first message is a long term key message and the second message is a short term key message.

10. The server system according to claim 9, wherein the broadcast system is an OMA BCAST system.

11. A computer readable non-transitory storage medium storing one or more programs, the programs comprising instructions, which, when being executed by a processor, cause the processor to perform a method for controlling a validity of the description key, the method comprising:

generating a first timestamp indicating a start time from which a decryption key is valid, and a second timestamp indicating an end time until which the decryption key is valid, and transmitting a first message comprising the first timestamp and the second timestamp from a server system to a client service;

generating a third timestamp indicating a time to be compared with the first timestamp and the second timestamp, transmitting a second message comprising the third timestamp from the server system to the client device, wherein the first timestamp and the second timestamp are on a first timescale and the third timestamp is on a second timescale, wherein the first timescale is defined as the second timescale multiplied by a first factor larger than one so that the third timestamp advances slower in time relative to the first timescale during an event associated with the first timestamp and the second timestamp, and wherein the first, second and third timestamp enable the client device to decrypt the encrypted data with the decryption key, in response to determining that the third timestamp is greater than or equal to the first timestamp and less than or equal to the second timestamp, and multiplying the third timestamp by a second factor larger than zero to obtain the third timestamp to be transmitted to the client device.

* * * * *